US000001133H

United States Statutory Invention Registration [19]

[11] Reg. Number: H1133

[43] Published: Feb. 2, 1993

Bridges et al.

[54] AIRCRAFT ARRESTING SYSTEM AND METHOD

[75] Inventors: William P. Bridges, Andrews AFB, Md.; James Y. Adkins, Niceville, Fla.; Steven W. Leas, Lancaster, Calif.

[73] Assignee: The United States of America as represented by the Secretary of the Air Force, Washington, D.C.

[21] Appl. No.: 540,718

[22] Filed: Jun. 15, 1990

[51] Int. Cl.[5] ..... B64C 25/68; B64F 1/02

[52] U.S. Cl. ..... 244/110 C; 244/110 D; 244/113

[58] Field of Search ..... 244/110 R, 110 C, 110 D, 244/110 F, 113 R, 114 R

[56] References Cited

U.S. PATENT DOCUMENTS

| | | | |
|---|---|---|---|
| 2,440,574 | 4/1948 | Cotton | 244/110 C |
| 2,448,039 | 8/1948 | Lynn | 244/110 C |
| 2,450,328 | 9/1948 | Cotton | 244/110 C |
| 2,949,263 | 8/1960 | Steinthal | 244/113 R |
| 2,977,074 | 3/1961 | Cotton | 244/110 R |
| 3,013,750 | 12/1961 | Fonden et al. | 244/110 C |
| 3,029,049 | 4/1962 | Walker | 244/110 D |
| 3,142,458 | 7/1964 | Byrne et al. | 244/63 |
| 3,207,459 | 9/1965 | Kinch | 244/110 R |
| 3,468,500 | 9/1969 | Carlsson | 244/110 C |
| 3,484,061 | 12/1969 | Niemkiewicz | 244/110 R |
| 3,578,271 | 5/1971 | Thompson, Jr. | 244/110 R |
| 3,599,906 | 8/1971 | Reinemuth | 244/110 R |

*Primary Examiner*—David H. Brown

*Attorney, Agent, or Firm*—Richard A. Lambert; Donald J. Singer

[57] ABSTRACT

An aircraft arresting system providing a controlled, gradual aircraft deceleration is disclosed. The system includes an arresting barrier comprised of a triggering net/parachute combination. The triggering net is aligned transversely to the runway and is actuated by contact with the aircraft nose landing gear. An engaging cable, releasably retained on the triggering net, is then thrust upwardly to entangle the aircraft main landing gear. A pair of parachutes, attached to the engaging cable, are deployed as a result of the continued aircraft motion. Once deployed, the parachutes provide the desired gradual decelerative force to slow the aircraft. The preferred embodiment of the aircraft arresting system includes three arresting barriers spaced a distance longitudinally on the runway to provide a reliable aircraft engagement and a controlled rate of arrest. An associated method is disclosed wherein the rate of arrest of the aircraft is determined after deployment of the first set of parachutes, and the second or third barriers deployed to provide a greater rate of arrest when desired.

11 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIRCRAFT ARRESTING SYSTEM AND METHOD

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for arresting aircraft and, more particularly, to a runway mounted aircraft arresting system and method utilizing aircraft engaging triggering nets with parachutes attached thereto to provide a controlled, reliable aircraft arrest.

The advantages of providing reliable runway mounted aircraft arresting systems are known. Indeed, such systems are necessary to arrest modern jet aircraft landing on shortened runways such as found on aircraft carriers, for example. Further, such systems are of tremendous benefit during emergency landings of malfunctioning aircraft or to prevent accidental travel beyond the end of the runway.

The desirability of an effective aircraft arresting system is even more apparent when usage in non-powered landing situations such as experienced in the National Aeronautics and Space this application, the aircraft must land safely the first time as no second attempts are available. This problem becomes compounded in a flight abort situation wherein the shuttle is forced to land with a nearly full complement of fuel and equipment and is thus very heavily laden. This increases stopping distances and the probability of aircraft damage if high decelerative forces are applied to the external structure in an attempt to arrest the aircraft. Thus, the typical emergency type barriers such as end of the runway nets or the like are not suitable in this application.

Several aircraft arresting systems providing a more gradual arrest rate have been developed to date. For example, U.S. Pat. No. 3,029,049 to Walker entitled "Deceleration Gear" discloses a runway mounted apparatus for arresting aircraft. The apparatus disclosed includes an arresting cable assembly, a pair of stanchions for locating and supporting the cable assembly and one or more parachutes retained within receiving container assemblies During operation, an aircraft mounted hook snags the cable assembly, thereby releasing it from the stanchions. Simultaneously, the parachutes are pulled from their respective containers. As shown, the Walker apparatus is rather complicated and thus not suited to quick deployment in an emergency type situation. Additionally, since an aircraft mounted hook is required, use of the apparatus is limited to aircraft so equipped.

U.S. Pat. No. 3,484,061 to Niemkiewicz discloses an aircraft arresting system utilizing two aircraft engaging cables or pendants. First and second energy absorbing units are attached to the pendants to provide the arresting force. The magnitude of the arresting force is varied depending on which pendant is engaged. This increases system complexity as well as the time and expense of preparing the system for usage. Further, high forces are applied during a short period of time, exacerbating aircraft damage and thus rendering the apparatus unsuitable for many applications, such as for the space shuttle program as recited above.

A need exists therefore for an improved aircraft arresting system. Such a system would be simple, reliable and adaptable to a wide variety of aircraft in use today.

It is, therefore, a primary object of the present invention to provide an improved aircraft arresting system overcoming the limitations and disadvantages of the prior art.

. It is another object of the present invention to provide an aircraft arresting system suitable for use on a wide variety of aircraft and runway configurations.

It is yet another object of the present invention to provide an aircraft arresting system which can be quickly deployed for use in emergency situations or the like.

It is still another object of the present invention to provide an aircraft arresting system capable of decelerating heavy aircraft landing at high speeds with minimal damage to either the aircraft or its contents.

It is still another object of the present invention to provide an aircraft arresting system utilizing multiple, selectively deployable arresting barriers to provide reliable, gradual deceleration of the aircraft over the length of runway travel.

These and other objects of the invention will become apparent as the description of representative embodiments proceeds.

SUMMARY OF THE INVENTION

In accordance with the foregoing principles and objects of the invention, an aircraft arresting system and method are described. The preferred embodiment of the present invention includes three spaced arresting barriers. Each barrier is comprised of a triggering net for contacting the aircraft and a pair of parachutes, deployed by the action of the net, to provide desired decelerative force to slow the aircraft.

The triggering net is aligned transversely to the longitudinal axis of the runway. The net is retained at both sides of runway by stanchions. Advantageously, the stanchions are pivotally mounted with respect to the ground to allow the net to be readily raised to the operative position or lowered to inoperative or bypass position.

As will be apparent to one skilled in the art, suitable means can be utilized for remote deployment of the arresting barrier. In this way, the triggering net can be installed on the runway in advance and then quickly raised to the operative position on an as needed basis. When in the bypass mode, aircraft can simply pass over the net without deploying the parachutes.

An aircraft engaging cable or pendant is releasably retained on the bottom edge of the triggering net. A pair of parachutes for decelerating the aircraft are attached to the engaging cable. In the preferred embodiment, the engaging cable is a continuous loop and the parachutes are slidingly engaged thereon. This sliding engagement provides an enhanced braking effect by allowing the parachutes, once deployed, to quickly center themselves behind the aircraft and thus exert the maximum drag.

During operation, the nose landing gear of the aircraft strikes the triggering net. The continued motion of the causes the engaging cable to be thrust upwardly. The maintaining gear of the aircraft is then entangled by the cable as aircraft continues its forward motion.

The parachutes, being engaged upon the cable, are pulled behind the aircraft and forced into deployment. The preferred embodiment utilizes secondary or drogue parachutes to provide an initial drag to substantially increase the probability of main parachute deployment. However, if one parachute should fail to open, the remaining parachute will center behind the aircraft, due to the sliding engagement, thereby avoiding any undesirable drag steer effect.

As previously described, the aircraft arresting system and method of the present invention utilizes three arresting barriers each spaced a distance longitudinally down the runway. Each barrier is independently positionable to the operative or bypass position. According to the method of the present invention, the rate of arrest is determined after deployment of the first set of parachutes. More specifically, it the parachutes fail to deploy at the first barrier or if a greater rate of deceleration is desired, the next barrier is raised by the operator in readiness for contact with the aircraft. The determining step above is then repeated and the third barrier is raised, if desired.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
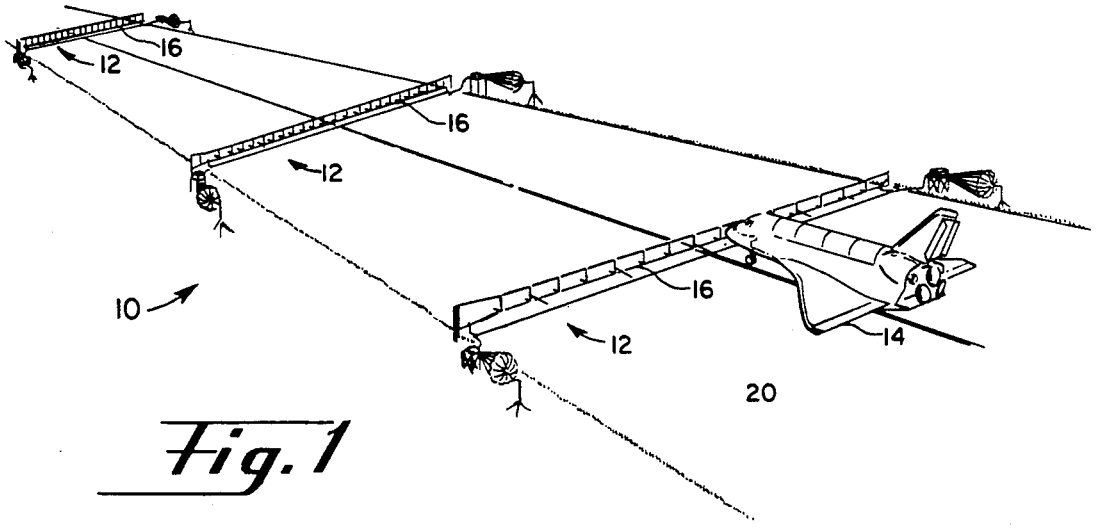
FIG. 1 is a perspective view of the aircraft arresting system of the present invention.

Reference is directed to FIG. 1 wherein the aircraft arresting system 10 of the present invention is illustrated. The preferred embodiment of the system 10 includes three spaced arresting barriers 12 for contacting the aircraft 14. Each barrier 12 is operable independently of the others. As shown, the aircraft 14 for which the preferred embodiment is described is the NASA space shuttle. Space shuttle landings present particular problems such as high aircraft landing speeds, limited maneuverability, high weight, etc. The system 10 has the capability of arresting a fully laden shuttle in a flight abort situation with a minimum of aircraft damage. It should be realized, however, that the system 10 can be effectively utilized on a wide variety of aircraft. For example, the system 10 has tremendous utility in commercial passenger aircraft applications where a gradual deceleration rate coupled with minimal forces applied to the aircraft interior are highly desirable.

Figure 2:
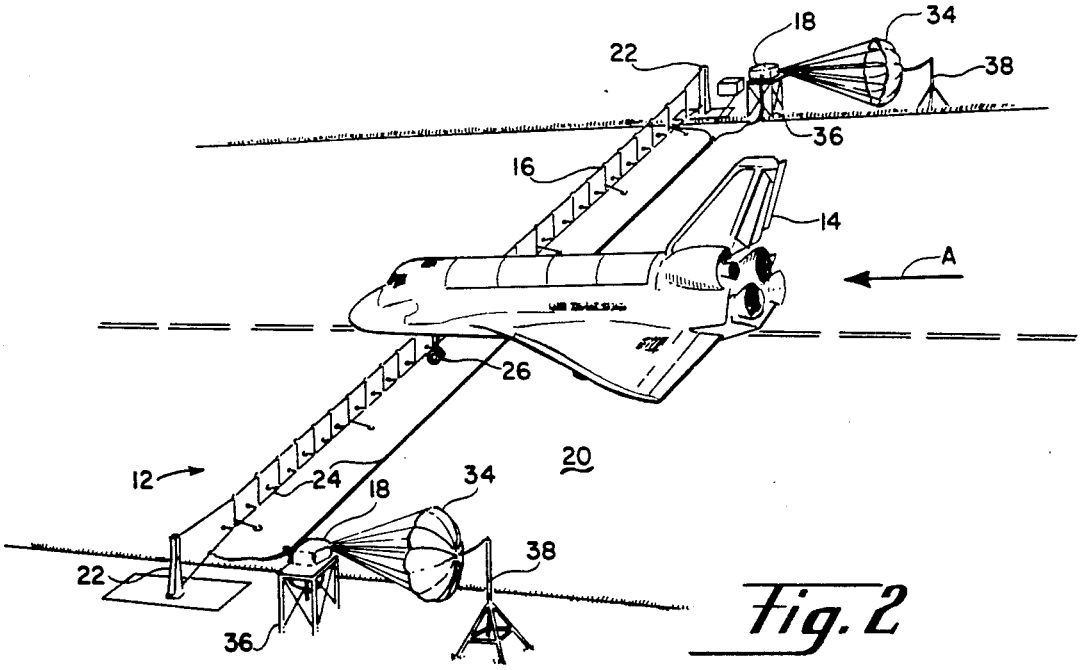
FIG. 2 is a perspective view of the aircraft arresting system of the present invention, showing an aircraft immediately prior to engagement with the arresting barrier.
Figure 3:
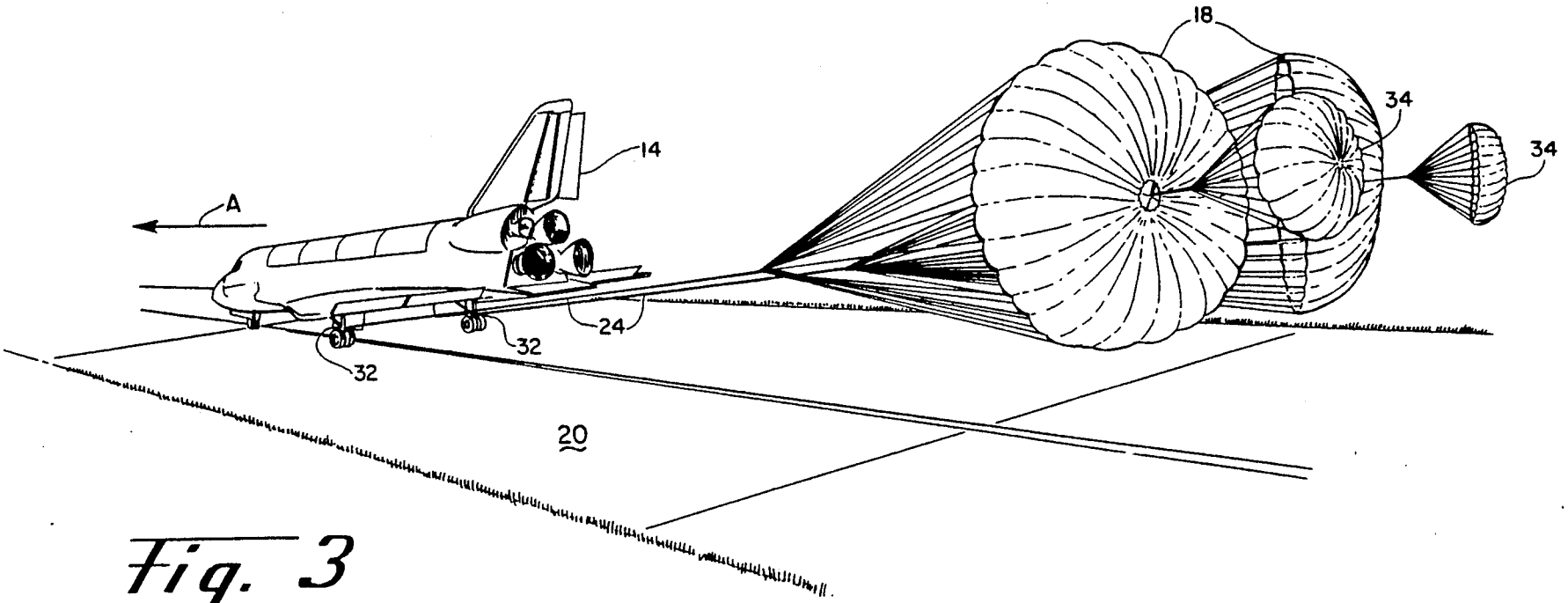
FIG. 3 is a perspective view of the aircraft after engagement with an arresting barrier and deployment of the decelerating parachutes.

As shown in FIGS. 2 and 3, each barrier 12 is comprised of a triggering net 16 and a pair of parachutes 18. It should be pointed out that although the preferred embodiment is described in terms of utilizing parachutes, other fluid braking means such as hydraulic systems can be effectively used. The parachutes 18 are deployed by the aircraft engaging action of the net 16 components as will be described below to provide the desired decelerative force to arrest the aircraft 14. Advantageously, the parachutes 18 also provide adaptability to the system 10. This is because although sized for a specific application they are readily interchangeable as desired for different aircraft applications or decelerative rates. Thus, the system 10 is relatively easily and inexpensively adapted to a maximum number of applications.

As shown in FIGS. 1 and 2, each triggering net 16 is aligned transversely to the longitudinal axis of the runway 20. The first net 16 is located a predetermined distance from the approach end of the runway 20. This distance will be aircraft specific and will also be dictated by the length of the runway available. In the preferred embodiment, for example, this distance is approximately 6000 feet. This will allow the aircraft 14 to apply initial aerodynamic braking, if conditions permit, and then achieve a three-point attitude prior to engagement. The other two nets 16 are spaced a distance from the first net and each other. In the preferred embodiment, this distance is 1500 feet. Each net 16 is retained at the edges of the runway 20 by support stanchions 22. Advantageously, the stanchions 22 are pivotally mounted with respect to the runway to facilitate raising or lowering the arresting barrier 12 as desired. Appropriate means (not shown) can be implemented to facilitate remote positioning of the stanchions 22. This facilitates an advance system 10 installation and later barrier 12 positioning quickly and on an as needed basis.

Advantageously and according to an important aspect of the present invention, the provision of three arresting barriers 12 in the system 10 creates a double redundancy factor for enhanced safety and reliability. Further, and according to the method of the present invention, increased deceleration rates can be selectively provided by utilizing the second or even the third barrier. More specifically and as will be described in more detail below, the performance of the system 10 is fine-tuned by determining the rate of arrest after the deployment of the first set of parachutes 18 and by positioning the next arresting barrier 12, if necessary, to provide a greater rate of arrest. Therefore, a controlled, gradual rate of deceleration is possible utilizing the system 10 and method. This provides a reliable aircraft 14 arrest while minimizing damage to either the aircraft or its cargo representing a great improvement over the prior art systems which exert high arresting forces over a short period of time, resulting in aircraft damage or, worse, a complete failure to arrest.

As shown in FIG. 2 an engaging cable 24 is releasably retained on the bottom of the triggering net 16. According to an important aspect of the present invention, the cable 24 is a continuous loop and the parachutes 18 are attached by a sliding engagement. This sliding engagement can be accomplished by utilizing a ring encircling the cable 24 or by other low friction means as desired. Advantageously, the looped cable/sliding parachute combination provides an enhanced braking effect by allowing the parachutes 18 to freely move along the cable 24. This allows the parachutes 18 to center themselves behind the aircraft 14. (See FIG. 3). In the event that one parachute should fail to open, the other parachute 18, due to the sliding engagement, centers behind the aircraft 14 to provide a centrally located deceleration force and avoid any undesirable drag steer effects.

Figure 4:
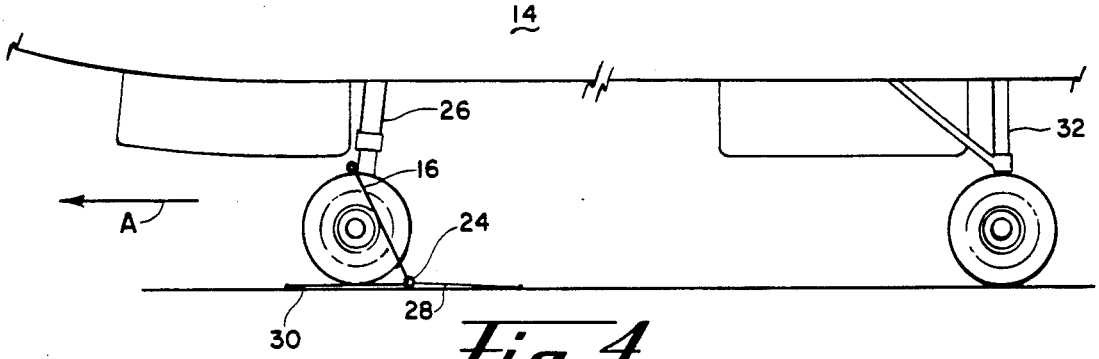
FIGS. 4–7 are diagrammatic views of the aircraft arresting system of the present invention showing sequentially the action of an arresting barrier.
Figure 5:
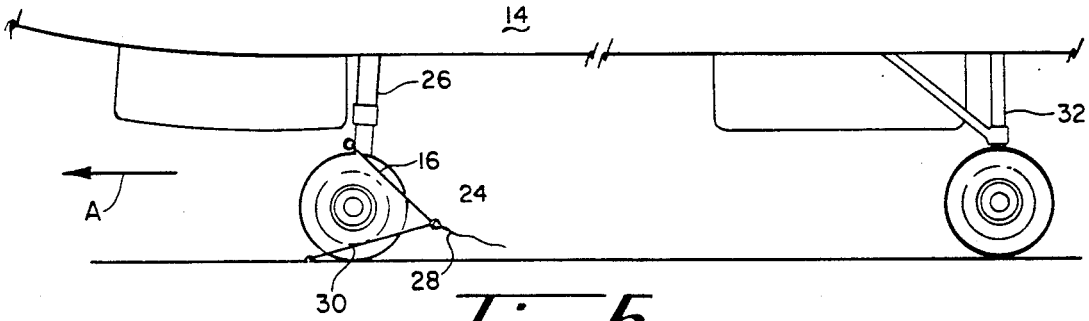
Figure 6:
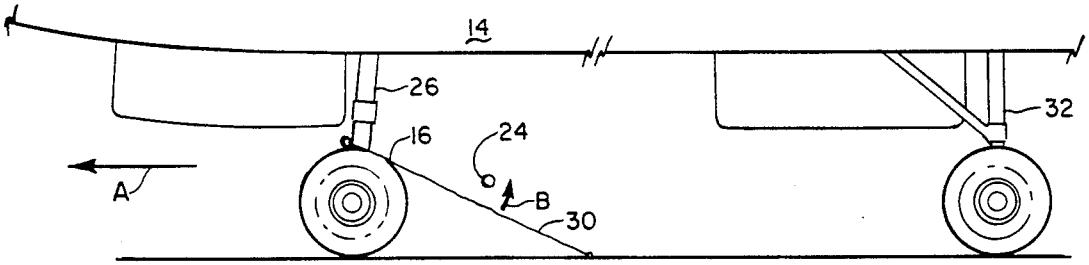
Figure 7:
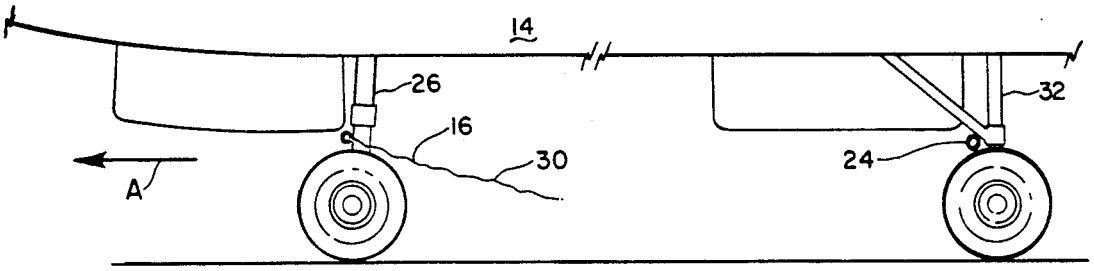

Reference is directed to FIGS. 2 and 4–7 wherein the operation of an arresting barrier 12 is shown. Prior to the approach of the aircraft 14, the first triggering net 16 may be positioned. As stated, this is accomplished by raising the stanchions 22. The direction of motion of the aircraft 14 during landing is shown by action arrow A. As shown in FIGS. 2 and 4 the nose gear 26 of the aircraft 14 approaches and strikes the triggering net 16 of the arresting barrier 12. The net is anchored to the runway 20 in both the fore and aft positions, by portions 28 and 30 respectively. As shown in FIG. 5, as the aircraft 14 continues travelling in the forward direction the forward portion 28 of the net 16 is raised upwardly and breaks away from the surface of the runway 20. As the aircraft 14 motion continues, and as shown in FIG. 6, the aft portion 30 of the net is stretched taut. This action has the effect of releasing the cable 24 and simultaneously thrusting it upwardly in the direction of action arrow B. While airborne, the cable 24 is struck and thus entangled by the aircraft main landing gear 32. Finally, the aft portion 30 of the net 16 breaks away from the runway 20 as shown in FIG. 7.

As the aircraft 14 motion continues, the cable 24, being entangled by the main landing gear 32, becomes taut and exerts a pulling force upon the parachutes 18, forcing them into deployment. As shown in FIG. 2, secondary or drogue parachutes 34 provide an initial drag to assure deployment of the parachutes 18. Stands 36 and 38 locate and retain the main parachutes 18 and the drogue parachutes 34 respectively. The stands 36, 38 maintain the parachutes 18, 34 above the ground in readiness for usage and thus assist in deployment.

As previously stated, and according to the method of the present invention, the rate of deceleration of the aircraft 14 is determined after contact with the first barrier 12. This determination can be performed visually by observing whether both parachutes 18 have fully deployed. Additionally, suitable means (not shown) such as an aircraft mounted accelerometer can be consulted to provide a value for the rate of deceleration. This value is then compared to previously determined operational parameters based upon aircraft type and weight, landing speed, runway length, availability of aircraft brakes, etc. If the rate of deceleration is insufficient, based upon the above, the next arresting barrier 12 is raised. The operation of each subsequent barrier 12 upon contact with the aircraft 14 is as heretofore described.

In summary, numerous benefits have been described from employing the principles of the present invention. The aircraft arresting system 10 and associated method can be used effectively in a wide variety of aircraft applications, and the space shuttle in particular. The provision of three arresting barriers 12 provides increased safety and reliability through double redundancy and also provides for a further degree of flexibility by allowing the operator to utilize an additional barrier(s) 12 when a greater rate of deceleration is desired. It should be understood that certain modifications to the equipment defining the system 10 of the invention or to the operative steps of the method may be made as might occur to one with skill in the field of this invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An arresting system for aircraft having ground engaging landing gear including a forward nose gear and a main landing gear, for use on a runway having an elongated longitudinal axis, comprising:

triggering means operable upon contact with the aircraft nose gear, said triggering means being a net having a top and bottom edge, and being aligned transversely to the longitudinal axis of the runway, said top edge being of a height less than the height of the aircraft;

means actuated by said triggering means for engaging the main landing gear of the aircraft; and fluid braking means attached to said engaging means for arresting the aircraft.

2. The arresting system of claim 1, wherein said engaging means is a cable releasably retained on said bottom edge of said net.

3. The arresting system of claim 1, wherein said braking means is at least one parachute.

4. The arresting system of claim 1, wherein said triggering means is located a distance from the approach end of the runway.

5. The arresting system of claim 4, wherein said distance is about 6000 feet.

6. The arresting system of claim 5, further including a second arresting system and a third arresting system, said second arresting system being spaced 1500 feet from the first mentioned arresting system away from the approach end of the runway, said third arresting system being spaced 1500 feet from said second arresting system away from the approach end of the runway.

7. The arresting system of claim 1, wherein said braking means is two parachutes, each of said parachutes being situated on opposite sides of the runway.

8. The arresting system of claim 7, wherein each said parachute is slidingly engaged upon said cable.

9. The arresting system of claim 8, wherein each said parachute includes deployment means.

10. The arresting system of claim 9, wherein said deployment means is a secondary parachute.

11. A method of arresting an aircraft having ground engaging landing gear including a forward nose gear and a main landing gear upon a runway having an elongated longitudinal axis comprising the steps of:

(a) positioning a triggering net having a height less than the height of the aircraft, a landing gear engaging cable and fluid braking means attached thereto transversely to the longitudinal axis of the runway;

(b) engaging the main landing gear with said cable in response to contact of said net by the aircraft nose gear;

(c) deploying said fluid braking means by said cable to arrest the aircraft;

(d) determining the rate of arrest of the aircraft; and, (e) repeating steps (a) through (c) to effect a greater rate of arrest from said determining step, when desired.

* * * * *